(12) United States Patent
Hilberer

(10) Patent No.: US 9,308,906 B2
(45) Date of Patent: Apr. 12, 2016

(54) ELECTRICAL PARKING BRAKE SYSTEM FOR A UTILITY VEHICLE AND OPERATING METHOD

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/564,580

(22) Filed: Sep. 22, 2009

(65) Prior Publication Data

US 2010/0244550 A1    Sep. 30, 2010

Related U.S. Application Data

(63) Continuation of application No. PCT/EP2008/002248, filed on Mar. 20, 2008.

(30) Foreign Application Priority Data

Mar. 22, 2007   (DE) .......................... 10 2007 014 427

(51) Int. Cl.
*B60T 13/74* (2006.01)
*B60T 13/68* (2006.01)
(Continued)

(52) U.S. Cl.
CPC .............. *B60T 13/683* (2013.01); *B60T 15/041* (2013.01); *B60T 8/17* (2013.01); *B60T 8/1837* (2013.01); *B60T 15/027* (2013.01)

(58) Field of Classification Search
CPC ............. B60T 7/047; B60T 7/08; B60T 8/17; B60T 8/171; B60T 8/18; B60T 8/1837; B60T 8/1875; B60T 11/012; B60T 11/128; B60T 15/02; B60T 15/027; B60T 15/36; B60T 17/085; B60T 13/683; B60T 15/041

USPC ......... 303/3, 7, 6.01, 9.61, 13, 15, 16, 17, 20, 303/71, 127; 188/151 R, 152, 352
See application file for complete search history.

(56) References Cited

U.S. PATENT DOCUMENTS 4,640,677 A * 2/1987 Huber ............................. 431/89
4,824,178 A   4/1989 Petersen
(Continued)

FOREIGN PATENT DOCUMENTS

DE   35 27 907 A1   2/1987
DE   103 41 723 B4  4/2006
(Continued)

OTHER PUBLICATIONS

German Office Action dated Nov. 12, 2007 including English translation (Six (6) pages).

(Continued)

*Primary Examiner* — Melody Burch
(74) *Attorney, Agent, or Firm* — Crowell & Moring LLP

(57) ABSTRACT

An electrical parking brake system and method for a commercial vehicle includes a valve device, which connects a compressed-air supply with a spring brake cylinder without an intermediate connection of a hand brake valve. The valve device aerates the spring brake cylinder in a first switching state and deaerates the spring brake cylinder in a second switching state. The system further includes a pressure sensor, which measures a pressure on the compressed air supply side, and an electronic control unit for directly or indirectly controlling the valve device, acquiring a signal supplied by the pressure sensor, and acquiring an indicator signal for the presence of an individual in a cab of the vehicle. The valve device can only be transferred to its first switching state by the control unit if the pressure on the compressed air supply side exceeds a pressure threshold value and if the presence of an individual in a cab of the vehicle is indicated.

21 Claims, 2 Drawing Sheets

(51) Int. Cl.
  *B60T 15/04* (2006.01)
  *B60T 15/14* (2006.01)
  *B60T 8/18* (2006.01)
  *B60T 8/17* (2006.01)
  *B60T 15/02* (2006.01)

(56) References Cited

U.S. PATENT DOCUMENTS

| | | | | |
|---|---|---|---|---|
| 4,938,118 | A * | 7/1990 | Wolfges et al. | 91/361 |
| 5,472,227 | A * | 12/1995 | Schonfeld et al. | 280/683 |
| 5,533,795 | A * | 7/1996 | Brooks | 303/6.1 |
| 2004/0112440 | A1* | 6/2004 | Bramley et al. | 137/596.16 |
| 2006/0048824 | A1* | 3/2006 | Dochla et al. | 137/596.2 |
| 2006/0244305 | A1 | 11/2006 | Hilberer | |
| 2007/0007817 | A1* | 1/2007 | Nonaga et al. | 303/155 |
| 2010/0025141 | A1* | 2/2010 | Bensch et al. | 180/271 |

FOREIGN PATENT DOCUMENTS

| | | |
|---|---|---|
| EP | 0 145 921 A2 | 6/1985 |
| RU | 2177889 C2 * | 1/2002 |
| WO | WO 2005/025958 A1 | 3/2005 |

OTHER PUBLICATIONS

International Search Report dated Aug. 7, 2008 Including English translation (Four (4) pages).

* cited by examiner

ELECTRICAL PARKING BRAKE SYSTEM FOR A UTILITY VEHICLE AND OPERATING METHOD

CROSS-REFERENCE TO RELATED APPLICATIONS

This application is a continuation of PCT International Application No. PCT/EP2008/002248, filed Mar. 20, 2008, which claims priority under 35 U.S.C. §119 to German Patent Application No. DE 10 2007 014 427.1, filed Mar. 22, 2007, the entire disclosures of which are herein expressly incorporated by reference.

BACKGROUND AND SUMMARY OF THE INVENTION

The invention relates to an electrical parking brake system for a commercial or utility vehicle and to a method for operating the electrical parking brake system.

In commercial or utility vehicles, electrical parking brake systems, which have to be integrated into the pneumatic brake system of the vehicle, are being used to an increasing degree. The particular feature of electrical parking brake systems is that a handbrake valve is no longer provided to operate them but rather an electrical switch which transmits signals to the electronic control unit of the parking brake system. The electronic control unit then actuates one or more valves as a function of these signals in order to in this way ventilate or vent the spring-type brake cylinders of the parking brake system, that is to say to release or apply the parking brake system.

With respect to ventilation, that is to say the release of the parking brake system, it is important to comply with certain safety criteria. In particular, the parking brake must never be opened if there is still sufficient pressure in the service brake system to activate the service brake. At least what is referred to as the auxiliary brake pressure must be present, the auxiliary brake pressure being a pressure below the normal service brake pressure which is, however, already sufficient to brake the motor vehicle.

In particular, in some countries in northern Europe there are further safety regulations which apply. These regulations require what is referred to as the "Northland Park Brake Function". This ensures that the parking brake can be released only if the driver is in the driver's cab. This is self-evident under normal conditions, that is to say when there is sufficient pressure in the brake system, because the activation element for releasing the parking brake is located in the driver's cab so that the driver must necessarily be present in the driver's cab, as a result of which, when the parking brake is released, he is also able to bring the vehicle to a standstill at any time by activating the service brake. However, a hazardous situation may occur if the driver starts the vehicle engine when the brake system is pressureless, and therefore only then does he activate the build-up of pressure through the operation of the compressor. If the driver opens the compressed air path to the spring-type brake cylinders at this time, this means that the parking brake will not yet be released owing to inadequate pressure. The vehicle is therefore stationary and the driver could assume incorrectly that overall the situation is safe. If the driver then leaves the driver's cab, in order, for example, to clear away ice from an iced-up windshield, this may lead to a situation in which the pressure becomes sufficient to release the parking brake precisely when the driver is no longer located in the driver's cab. This results in the vehicle rolling away and possibly even rolling over the driver who is concerned with cleaning the windows.

DE 103 41 723 B4 has already proposed a concept for avoiding this problem. This concept is based on the fact that the control unit of an air-treatment system monitors signals which are characteristic of the presence of the driver in the driver's cab. If these signals are not received, the compressed-air supply of the handbrake valve, and therefore also of the spring-type brake cylinders, is shut off. The compressed-air supply of the parking brake is not enabled by the air-treatment system until the driver is present and there is sufficient pressure available for the auxiliary braking effect. Shutting off or enabling of the supply of the air-treatment system is carried out here in such a way that the function of an overflow valve, which is assigned to the parking brake system, is influenced by ventilating or venting a control inlet of the overflow valve.

The invention is based on the object of implementing in a simplified fashion the "Northland Park Brake Function" described above.

This object is achieved by an electrical parking brake system for a utility vehicle, having a valve device which connects a compressed-air supply to a spring-type brake cylinder without intermediate connection of a handbrake valve, wherein in a first switched state the electrically actuable valve device ventilates (aerates) the spring-type brake cylinder, and in a second switched state the valve device vents (deaerates) the spring-type actuator. A pressure sensor is provided with which a compressed-air-supply-side pressure can be measured. An electronic control unit directly or indirectly actuates the valve device, registers a signal supplied by the pressure sensor and registers an indicator signal for the presence of a person in a driver's cab of the utility vehicle. The valve device can be transferred into its first switched state by the control unit only when the compressed-air-supply-side pressure exceeds a pressure threshold value and the indicator of the presence of a person in a driver's cab of the utility vehicle is present. In this way, a means of disabling the release of the parking brake on the supply side can be dispensed with so that, in particular, there is no need to provide a solenoid valve which is able, when necessary, to shut off an overflow valve which supplies the parking brake system. Instead, the valve device which is generally used for the pneumatic activation of the parking brake system is also directly influenced by the control device of the electrical parking brake system with respect to the shutting off of the ventilation of the parking brake cylinders. In this context, the electronic control unit of the parking brake system can perform a large number of tasks which are associated with the desired safety function, specifically the registration of the indicator signals for the presence, the registration of a pressure for ensuring the auxiliary braking effect, the logical combination of these conditions for the ventilation of the parking brake and the actuation of the valve device for the electrical parking brake system.

It is preferred that the electronic control unit is connected to an activation element which is arranged in the driver's cab of the utility vehicle. This connection of the activation element (also referred to as a manual control unit) to the control unit can be implemented by a direct electrical connection or by a signal bus. The manual control unit influences the operating sequences of the electrical parking brake as a function of the driver's request, but does so while decisively taking into account the safety functions in question.

It is advantageously provided that the valve device is a 3/2 way valve. Such a 3/2 way valve makes the necessary functionality available. Alternatively, it is also possible to provide that, instead of a 3/2 way valve, two 2/2 way valves which are arranged in parallel are provided. One of these two 2/2 way valves makes available, in the energized state, a connection to a supply, while the other 2/2 way valve makes available, in the energized state, a venting function. In the currentless state, the two 2/2 way valves are switched into the shut-off position by way of a spring.

It is advantageously possible to provide for the 3/2 way valve to be an electrically actuable solenoid valve. In particular, the electrically actuable solenoid valve can be a directly controlled 3/2 way solenoid valve which is arranged in the supply path and the venting path of the spring-type brake cylinders. If, in this case, the 3/2 way valve is replaced by two 2/2 way valves, one of these 2/2 way valves is responsible for ventilating the spring-type brake cylinder, and the other 2/2 way valve is responsible for venting the spring-type brake cylinder.

Furthermore, it is also possible for the 3/2 way valve to be an electrically activated, pilot-controlled valve. Basically, even with such pilot-control it is possible to adopt various ways of making available the basic functionality of an electrically activated, pilot-controlled 3/2 way valve. For example, the pilot-controlled solenoid valve may be configured as a 3/2 way valve or in the form of two 2/2 way valves, while the valve which is arranged in the ventilation path and in the venting path of the spring-type brake cylinders is still embodied as a 3/2 way valve. In this case, one of the 2/2 way valves serves to ventilate a control chamber of the 3/2 way valve, while the other 2/2 way solenoid valve vents the control chamber of the 3/2 way valve. It is particularly advantageous if the valve which is arranged in the venting path and the ventilation path of the spring-type brake cylinder can also implement a pressure-holding function in addition to the venting function and ventilation function. The pressure-holding function can be carried out, for example, by way of a slider valve which has an intermediate switched position between the venting switched position and the ventilating switched position, that is to say the slider valve is configured as a 3/3 way valve. The pressure-holding function can also be implemented on the basis of a 3/2 way relay valve, for example by use of pulse-width-modulated actuation.

It is possible to provide that the 3/2 way solenoid valve is bistable. In this way, a changeover between the two switched states of the valve device occurs only if corresponding control signals are output. Unintended release or application of the parking brake system is therefore avoided.

According to one aspect of the invention, there is provision that a 2/2 way valve is connected downstream of the 3/2 way valve. This increases the graduation capability of the parking brake system, in particular if a 2/2 way solenoid valve is arranged between a 3/2 way solenoid valve and the valve pilot-control chamber of a pilot-controlled valve.

It is possible to provide that the pressure sensor can be used to measure the pressure of the compressed air which is fed to the valve device. On the basis of this pressure it is possible to determine whether the necessary auxiliary braking effect is available.

Likewise it is possible to provide that the pressure sensor can be used to measure the pressure in one of the service brake circuits of the utility vehicle. This is advantageous, in particular, in the case of a serial supply of the parking brake system from the service brake circuits. In this case, there is preferably provision that the pressure threshold value is the closing pressure of an overflow valve which supplies the service brake circuit.

In a further embodiment of the present invention, the pressure sensor can be used to measure the pressure in a supply line which supplies both the service brake circuits and the valve device with compressed air. On the basis of a pressure measurement on such a central supply line it is also possible to assess whether the auxiliary braking effect can already be achieved.

It is possible to provide that the indicator signal for the presence of a person in a driver's cab of the utility vehicle can be transmitted to the electronic control unit when the driver's seat is occupied. According to a further embodiment, the indicator signal for the presence of a person in a driver's cab of the utility vehicle can be transmitted to the electronic control unit when the seat belt is put on.

The invention is also advantageously embodied in such a way that the indicator signal for the presence of a person in a driver's cab of the utility vehicle can be transmitted to the electronic control unit when the brake pedal and/or accelerator pedal are/is activated.

Furthermore, the valve device and/or the electronic control unit and/or the pressure sensor may be integrated into an air-treatment system. Even if the "Northland Park Brake Function" is no longer performed by the air-treatment system but rather by the electrical parking brake system, it can be equally advantageous to integrate components of the parking brake system into the electronic air-treatment system, in which case this includes, in particular, possible full integration, that is to say of the valve device, of the electronic control unit and of the necessary pressure sensors.

The invention also relates to a method for operating an electrical parking brake system for a utility vehicle, in which an electrically actuable valve device connects a compressed-air supply to a spring-type brake cylinder without intermediate connection of a handbrake valve. In a first switched state, the electrically actuable valve device ventilates the spring-type brake cylinder. In a second switched state, the electrically actuable valve device vents the spring-type actuator. A compressed-air-supply-side pressure is measured by a pressure sensor. An electronic control unit actuates the valve device and registers a signal which is supplied by the pressure sensor and an indicator of the presence of a person in a driver's cab of the utility vehicle, wherein the valve device is transferred into its first switched state only when the compressed-air-supply-side pressure exceeds a threshold value, and the indicator of the presence of a person in a driver's cab of the utility vehicle is present. In this way, the advantages and particular features of the electrical parking brake system according to the invention are also implemented in the method. This also applies in relation to the particularly preferred embodiments of the method according to the invention which are specified below.

The method is advantageously embodied in such a way that the electronic control unit registers signals from an activation element, which is arranged in the driver's cab of the utility vehicle.

It is preferred that the pressure sensor is used to measure the pressure of the compressed air which is fed to the valve device. Furthermore, it is possible to provide that the pressure sensor is used to measure the pressure in one of the service brake circuits of the utility vehicle.

The method can also be configured in such a way that the closing pressure of an overflow valve, which supplies the service brake circuit, is used as the pressure threshold value.

Furthermore, it is possible to provide that the pressure sensor is used to measure the pressure in a supply line which supplies both the service brake circuits and the valve device with compressed air.

The invention is particularly advantageously developed by a method such that the indicator signal for the presence of a person in a driver's cab of the utility vehicle is transmitted to the electronic control unit when the driver's seat is occupied.

It is also possible for the indicator signal for the presence of a person in a driver's cab of the utility vehicle to be transmitted to the electronic control unit when the seat belt is put on.

According to a further embodiment of the method according to the invention, the indicator signal for the presence of a person in a driver's cab of the utility vehicle can be transmitted to the electronic control unit when the brake pedal and/or accelerator pedal are/is activated.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
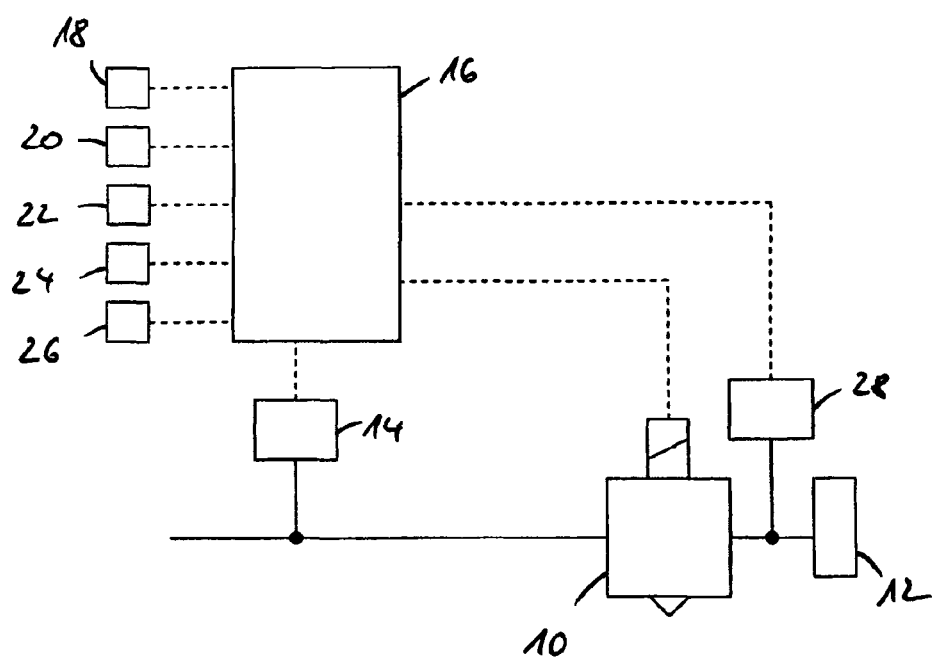
FIG. 1 is a schematic illustration of components of a first embodiment of an electrical parking brake system according to the invention.

FIG. 1 is a schematic illustration of components of a first embodiment of an electrical parking brake system according to the invention. In FIG. 1, continuous lines represent pneumatic lines, while dashed lines indicate electrical lines. A valve device 10 is provided by which compressed air can be applied to a spring-type brake cylinder 12. The spring-type brake cylinder 12 is representative of typical spring-type brake cylinders which can be actuated by the valve device 10. The pressure, which is applied by the valve device 10, is registered by a pressure sensor 28. A signal corresponding to the pressure is output to an electronic control unit 16 by the pressure sensor 28, as a result of which the pressure in the spring-type brake cylinder 12 can be taken into account during the control of the parking brake system, and in particular during the electrical actuation of the valve device 10.

In addition to the ventilating switched state of the valve device 10, the valve device 10 can vent the spring-type brake cylinder 12. A further pressure sensor 14 is provided, which registers a pressure on the compressed-air-supply side of the valve device 10 and transmits a corresponding signal to the electronic control unit 16. This pressure can, as illustrated, be measured directly upstream of the valve device 10. It can also be measured in the service brake circuits or in a main supply line. It simply has to be characteristic of whether the auxiliary braking effect is already ensured for the operating system. The electronic control unit 16 is connected to other components, specifically and in particular an electrical activation element 18 for the electrical parking brake system which is arranged in the form of a switch or the like in the driver's cab of the vehicle. Furthermore, the electronic control unit 16 can be connected to one or more of the following further components, specifically a seat occupation sensor 20, a brake pedal sensor 22, an accelerator pedal sensor 24 or a seat belt sensor 26. These sensors can supply reliable information as to whether the driver is present in the driver's cab, so that an enabling process takes place within the control unit 16 as a function thereof, and when there is a sufficient pressure measured by the pressure sensor 14, in order to transfer, on this basis, the valve device 10 into a state in which the spring-type brake cylinder 12 is ventilated.

Figure 2:
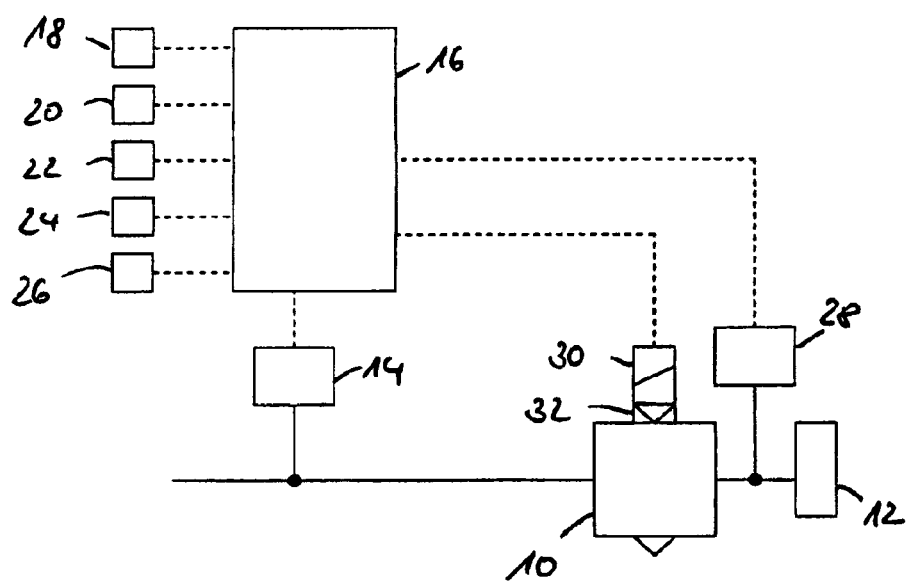
FIG. 2 is a schematic illustration of components of a second embodiment of an electrical parking brake system according to the invention.

FIG. 2 is a schematic illustration of components of a second embodiment of an electrical parking brake system according to the invention. According to FIG. 2, the parking brake system corresponds largely to that according to FIG. 1. In contrast to FIG. 1, the valve device 10 is configured as a pilot-controlled valve, with the pilot-controlled solenoid valve 30 and the pilot-controlled piston 32 being represented by their respective switching symbols. As a result, relatively large flow cross sections can easily be made available in the valve region. The pilot-control can be provided by a 3/2 way solenoid valve or, for example, also by two 2/2 way solenoid valves which are connected in parallel. In its energized state, in the latter case one of the solenoid valves connects the supply to a pilot-control chamber, while the other solenoid valve vents the pilot-control chamber in the energized state. In the currentless state, both 2/2 way solenoid valves are switched into the shutoff position by a spring.

| Table of Reference Numerals: |
| --- |
| 10 Valve device |
| 12 Spring-type brake cylinder |
| 14 Pressure sensor |
| 16 Electronic control unit |
| 18 Activation element |
| 20 Seat occupation sensor |
| 22 Brake pedal sensor |
| 24 Accelerator pedal sensor |
| 26 Seat belt sensor |
| 28 Pressure sensor |
| 30 Pilot-controlled solenoid valve |
| 32 Pilot-controlled piston |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical parking brake system for a commercial vehicle, comprising:

a spring brake cylinder;

a valve device operatively configured to connect a compressed-air supply to a parking brake supply line of the spring brake cylinder without an intermediate hand brake valve between the compressed-air supply and the valve device, the valve device aerates the spring brake cylinder in a first switched state to release the parking brake and deaerates the spring brake cylinder in a second switched state to engage the parking brake;

a pressure sensor operatively configured to sense a compressed-air-supply-side pressure in the first switched state and in the second switched state;

a vehicle occupancy sensor operatively configured to sense a presence of a person in a driver's cab of the commercial vehicle;

an electronic control unit operatively configured for actuating the valve device, registering a signal supplied by the pressure sensor, and registering an indicator signal for the presence of a person in the driver's cab of the commercial vehicle;

wherein the valve device is actuatable by the electronic control unit independent from a pressure level in the spring brake cylinder by the electronic control unit to deaerate the spring brake cylinder; and wherein the electronic control unit is configured to transfer the valve device into the first switched state only when the compressed-air-supply-side pressure exceeds a defined pressure threshold value and the indicator signal indicates that the person is present in the driver's cab of the commercial vehicle.

2. The electrical parking brake system according to claim 1, further comprising:
an activation element operatively arranged in the driver's cab of the commercial vehicle; and
wherein the electronic control unit is operatively coupled to the activation element.

3. The electrical parking brake system according to claim 1, wherein the valve device is a 3/2 way valve.

4. The electrical parking brake system according to claim 3, wherein the 3/2 way valve is an electrically activated solenoid valve.

5. The electrical parking brake system according to claim 3, wherein the 3/2 way valve is an electrically activated, pilot-controlled valve.

6. The electrical parking brake system according to claim 3, wherein the 3/2 way valve is bistable.

7. The electrical parking brake system according to claim 1, wherein the pressure sensor is operatively configured to measure pressure in one of one or more service brake circuits of the commercial vehicle.

8. The electrical parking brake system according to claim 7, wherein the defined pressure threshold value is a closing pressure of an overflow valve supplying the one service brake circuit.

9. The electrical parking brake system according to claim 1, wherein the pressure sensor is operatively configured to measure pressure in a supply line supplying both a service brake circuit and the valve device with compressed air.

10. The electrical parking brake system according to claim 1, wherein the indicator signal for the presence of the person in the driver's cab is transmitted to the electronic control unit when a driver's seat is occupied.

11. The electrical parking brake system according to claim 1, wherein the indicator signal for the presence of the person in the driver's cab is transmitted to the electronic control unit when a seat belt is closed.

12. The electrical parking brake system according to claim 1, wherein the indicator signal for the presence of the person in the driver's cab is transmitted to the electronic control unit when at least one of a brake pedal and an accelerator pedal are activated.

13. The electrical parking brake system according to claim 1, wherein at least one of the valve device, the electronic control unit, and the pressure sensor are integrated into an air-treatment system of the commercial vehicle.

14. A method of operating an electrical parking brake system for a commercial vehicle, in which an electrically actuatable valve device connects a compressed-air supply to a parking brake supply line of a spring brake cylinder without an intermediate hand brake valve between the compressed-air supply and the valve device, the valve device aerates the spring brake cylinder in a first switched state to release the parking brake and deaerates the spring brake cylinder in a second switched state to engage the parking brake, wherein the valve device is actuatable by an electronic control unit independent from a pressure level in the spring brake cylinder by the electronic control unit to deaerate the spring brake cylinder, the method comprising the acts of:
receiving, in the electronic control unit, a pressure indicative signal with respect to a compressed-air-supply-side pressure in the first switched state and in the second switched state, wherein the pressure indicative signal is measured by a pressure sensor;
receiving, in the electronic control unit, an indicator signal from a vehicle occupancy sensor operatively configured to sense a presence of a person in a driver's cab of the commercial vehicle; and
switching, via the electronic control unit, the valve device from a second switched state in which the valve device deaerates a spring actuator of the spring brake cylinder into a first switched state in which the valve device aerates the spring brake cylinder only when the compressed-air-supply-side pressure exceeds a defined threshold value and the indicator signal indicates the presence of the person in the driver's cab of the commercial vehicle.

15. The method according to claim 14, further comprising the act of receiving a signal from an activation element arranged in the driver's cab of the commercial vehicle.

16. The method according to claim 14, wherein the pressure sensor measures pressure in one of one or more service brake circuits of the commercial vehicle.

17. The method according to claim 16, wherein a closing pressure of an overflow valve supplying the one service brake circuit is used as the defined pressure threshold value.

18. The method according to claim 14, wherein the pressure sensor is used to measure pressure in a supply line supplying both a service brake circuit and the valve device with compressed air.

19. The method according to claim 14, wherein the electronic control unit receives the indicator signal for the presence of the person when a driver's seat is occupied.

20. The method according to claim 14, wherein the electronic control unit receives the indicator signal for the presence of the person when a seat belt is closed.

21. The method according to claim 14, wherein the electronic control unit receives the indicator signal for the presence of the person when at least one of a brake pedal and an accelerator are activated.

* * * * *